ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY

Feb. 14, 1967 E. K. KIETZ ET AL 3,304,377

SYNCHRONIZING SYSTEM FOR VIDEO TRANSDUCING APPARATUS UTILIZING COMPOSITE INFORMATION AND PILOT SIGNALS

Filed Sept. 11, 1961 12 Sheets-Sheet 6

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman
ATTORNEY

ERHARD K. KIETZ,
SIDNEY S. DAMRON &
JOHN F. VARNELL JR.
INVENTORS
BY Nathan N. Kallman
ATTORNEY

ERHARD K. KIETZ,
SIDNEY S. DAMRON &
JOHN F. VARNELL JR.
INVENTORS

BY Nathan N. Kallman
ATTORNEY

ERHARD K. KIETZ,
SIDNEY S. DAMRON &
JOHN F. VARNELL JR.
INVENTORS

BY Nathan N. Kallman

ATTORNEY

ERHARD K. KIETZ,
SIDNEY S. DAMRON &
JOHN F. VARNELL JR.
INVENTORS

BY Nathan N. Kallman

ATTORNEY 3,304,377

SYNCHRONIZING SYSTEM FOR VIDEO TRANSDUCING APPARATUS UTILIZING COMPOSITE INFORMATION AND PILOT SIGNALS

Erhard K. Kietz, Menlo Park, Sidney S. Damron, Los Altos, and John F. Varnell, Jr., Menlo Park, Calif., assignors to Ampex Corporation, Redwood City, Calif., a corporation of California Filed Sept. 11, 1961, Ser. No. 137,368
17 Claims. (Cl. 179—100.2)

This invention relates to magnetic tape apparatus, and in particular to a magnetic recording and playback system for processing continuous, transient-free, wideband information having very accurate time stability.

In one type of known magnetic tape apparatus used for magnetic recording and playback of signals over a wide frequency spectrum, a rotary drum assembly carrying a plurality of equally spaced magnetic heads at its periphery may be employed to scan a longitudinally moving magnetic tape transversely for recording a signal or for reproducing the signal information recorded on successive parallel tracks. Before one head begins to lose contact with the magnetic tape, the succeeding head makes contact so that identical information is recorded on the tape at the end of one transverse track and the beginning of the next transverse track. Switching means is provided during playback of the recorded signal for combining reproduced signal portions to form a substantially continuous output signal. The switching operation is accomplished during the "overlap" period in the reproduce mode; that is, when two successive heads both contact the tape. This type of apparatus has been successfully used for television signal recording and is described in U.S. Patents 2,916,546 and 2,968,692 both issued to C. P. Ginsberg et al., and assigned to the assignee of the instant invention. As is known, standard NTSC television signals include blanking intervals at the end of each horizontal video line and between each vertical field. Therefore, the switching operation is made to occur during such blanking intervals so that none of the video information signal is lost as a result of the switching.

However, there is a strong need for magnetic tape systems that can effectively process continuous wideband or high frequency signals, such as continuous radar or video information, that do not contain built-in blanking or synchronizing signals. The transverse scanning type of magnetic apparatus is especially adaptable for processing such high frequency signal information. However, if there is a continuous supply of information being received with no blanking intervals, synchronizing signals, or any other predetermined and repetitious information signal gaps, then there may be a loss of signal information during the switching operation between heads. In a copending U.S. application S.N. 97,051, filed March 20, 1961, now Patent No. 3,152,226, and assigned to the same assignee, there is defined an electronic switching circuit, referred to as a "slow switcher," that serves to combine a plurality of signals derived from a plurality of heads carried by the rotary scanning means so that transient signals are effectively minimized and a combined continuous signal having no loss of information is provided. Such a slow switching circuit utilizes a plurality of controlled symmetrical gates that conduct alternately to contribute to a continuous signal output having a substantially constant amplitude, even during the switching period.

When processing very high frequency signals, such as in the television or radar range, the occurrence of time base variations in a magnetic tape apparatus results in pronounced signal distortion and time displacement errors between subsequent portions of the signal. Time base errors may be introduced by head quadrature error, geometric distortion of the tape, mechanical load factors, the passage of a mechanical splice, or various other factors. Such time base errors are incorporated into the processed information signal and cause a noticeable displacement of the reproduced signal. To minimize the effects of such errors, the tape apparatus may include servomechanisms and synchronizing apparatus such as described in U.S. patent application S.N. 23,835, filed April 21, 1960, now Patent No. 3,017,462, and assigned to the same assignee. In the synchronizing apparatus (hereinafter referred to as the "Intersync" synchronizer) described therein, there is provided a synchronizing signal having a plurality of components, such as the horizontal and vertical synchronizing pulses of a standard television signal. A first synchronizing component is used to provide a relatively coarse adjustment of the rotational velocity of the rotary head scanning means to synchronize the presentation of information from the tape with another source of signal information. A second synchronizing component which has a substantially greater frequency than that of the first component is used to provide a relatively fine adjustment of the angular velocity of the scanning means.

Nevertheless, although improved synchronizing apparatus and switching devices have been incorporated in previous magnetic tape apparatus to provide angular adjustments for frequency and phase errors, it is most desirable to provide additional degrees of control, especially in systems where continuous, wideband signals or densely packed pulse signals of short duration are being processed.

An object of this invention is to provide an improved recording and reproducing system.

Another object of this invention is to provide a magnetic tape system that is capable of processing continuous, wideband signals with no appreciable loss of information.

Another object is to provide a magnetc tape system for recording and reproducing a continuous wideband signal that is free of transients and that has highly accurate time stability.

According to this invention, a magnetic recording and reproducing system utilizes a carrier signal that is frequency modulated by a continuous wideband information signal that is to be recorded. The frequency modulated signal is then added linearly with a pilot signal derived from a frequency standard or a stable oscillator, and the composite signal is recorded on a magnetic medium. The pilot signal has a frequency that is displaced substantially from the frequency range of the information signal to be recorded, and is of such value that it is compatible with the electronic passband characteristics and the magnetic head capabilities of the recording and reproducing system. The combined signal, including the information and pilot signal, may be recorded transversely or along an oblique path on a longitudinaly moving tape, by way of example. To aid in maintaining proper synchronization between a scanning means of a rotary head assembly and a tape driving means or tape capstan, a synchronizing system similar to that defined in the aforementioned patent application S.N. 23,835, filed April 21, 1960, now Patent No. 3,017,462, receives a pair of synchronizing signals from the frequency standard to provide coarse and fine phase adjustments of the scanning means relative to the tape driving means.

To reproduce the recorded signal without any substantial timing errors, the magnetically registered tracks of information are consecutively scanned by the rotary heads, and the transduced signals from each head or channel or signal portions are combined by switching means into a continuous signal, in a manner described in copending U.S. patent application S.N. 97,051, filed March 20, 1961, now Patent No. 3,152,226. However, prior to such combination, signal portions are acted upon by variable delay means, phase equalization means for compensation of static phase and amplitude errors, and time base correction means for dynamic time base errors, as will be described more fully hereinafter.

In another aspect of the invention, the synchronizing system that is employed during the record process is also utilized during the reproduce mode, and is controlled by an error voltage derived by phase comparison of the processed pilot signal and a reference synchronizing signal derived from a frequency standard identical to that which supplied the pilot signal. In addition, further means are provided to compensate for interference that may arise by cross modulation between the pilot signal and the data signal due to nonlinearities in the record and playback process. Various other features are provided by the system of this invention, and will be described in detail.

The invention will be described in greater detail with reference to the drawings in which:

FIGURE 1 is a block diagram of a recording system, in accordance with the invention;

FIGURES 2A and B are block diagrams of a reproduce system complementary to the recording system of FIGURE 1, according to the invention;

*Record mode*

Figure 1:
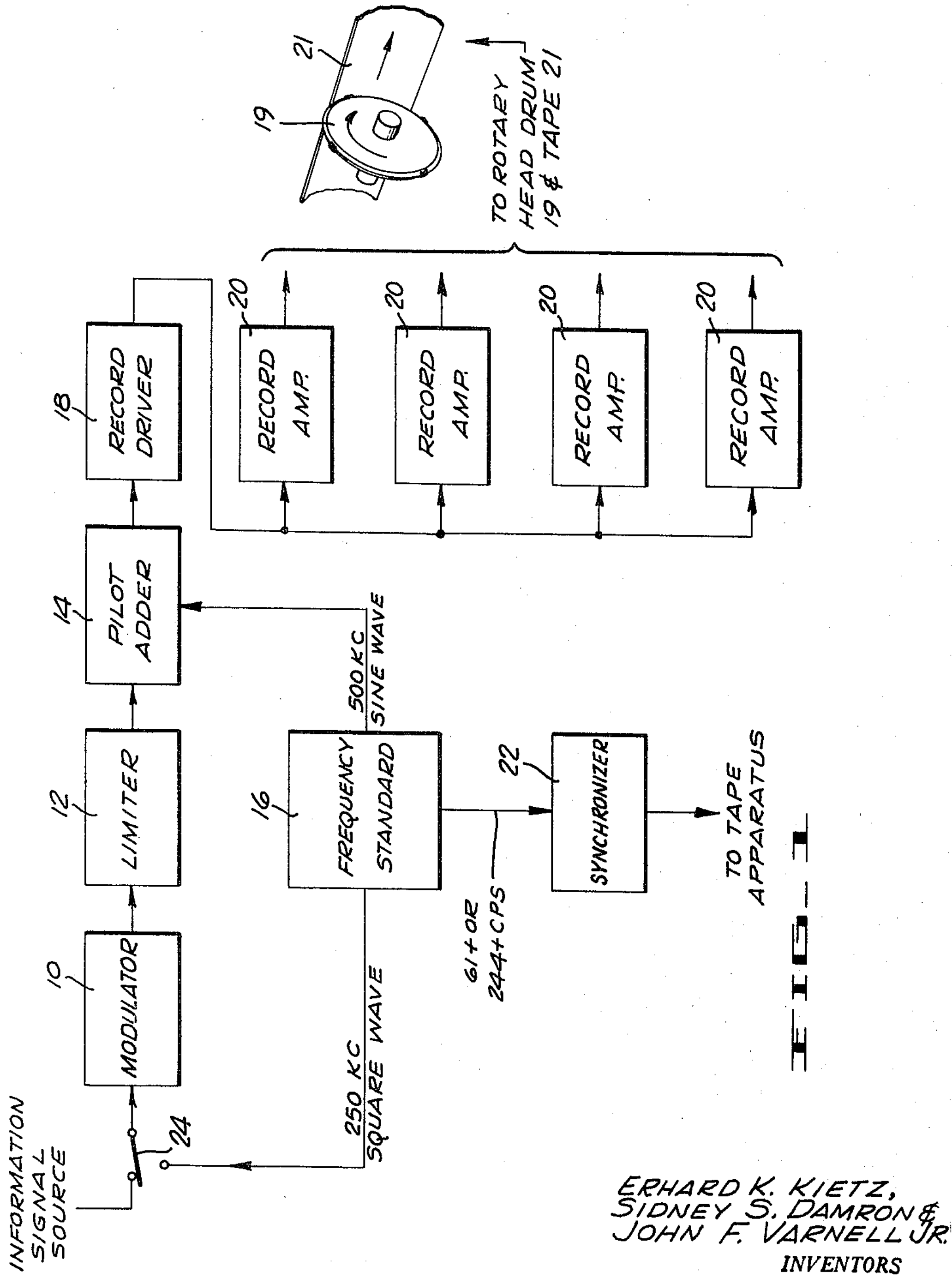

In an embodiment of the invention, a magnetic tape apparatus shown in FIGURE 1 incorporates a modulator 10 to which a wideband information signal, such as a radar or video signal, that is to be recorded is applied. The information signal frequency modulates a carrier signal, which may have a frequency of approximately 6 or 6.5 megacycles, for example. For frequency modulation by sine wave information, a 6 megacycle carrier that is deviated about .5 megacycle from the center frequency may be used, whereas for pulse signal modulation that employs a single polarity pulse, a 6.5 megacycle carrier frequency may be used for deviation down to 5.5 megacycles. The modulator 10 may be a multivibrator or of the heterodyne type, and a bandpass filter may be employed prior to the heterodyning to eliminate high order sideband signals that may introduce spurious frequency signal components caused by frequency fold-over in the heterodyned signal. The frequency modulated and heterodyned signal is then directed to a limiter 12 for eliminating spurious amplitude modulation, and the limited frequency modulated signal is fed to a pilot adder 14, shown in schematic detail in FIGURE 6, and described hereinafter.

Concurrently, a pilot signal that may be 500 kilocycles, by way of example, is derived from a frequency standard 16, which may comprise a stable crystal oscillator. The sine wave pilot signal has a frequency lower than the passband of the frequency-modulated data signal, but still being compatible with the recording characteristics of the tape apparatus. The pilot signal is added linearly to the frequency modulated signal in the pilot adder 14, and the combined signal is applied through a record driver 18 to record amplifiers 20 that feed the signal to be recorded to a rotating head assembly 19 of the magnetic tape apparatus that serve to record the signal on a magnetic medium or tape 21.

The frequency standard 16 is also employed to supply synchronizing reference signals, somewhat similar to the vertical and horizontal synchronizing signals found in a standard television signal, to a synchronizer 22, such as defined in U.S. patent application S.N. 23,835, now Patent No. 3,017,462, mentioned above. In the instant application, a pair of square wave outputs having frequencies of about 244 and 15,625 cycles per second respectively may be applied to the "Intersync" synchronizer 22 for maintaining a proper timing or phase relationship between the rotating head assembly and the tape driving capstan during the reproduce mode. In the record mode, only the 244 c.p.s. reference signal from the frequency standard 16 is used.

*Reproduce mode*

Figure 2A:
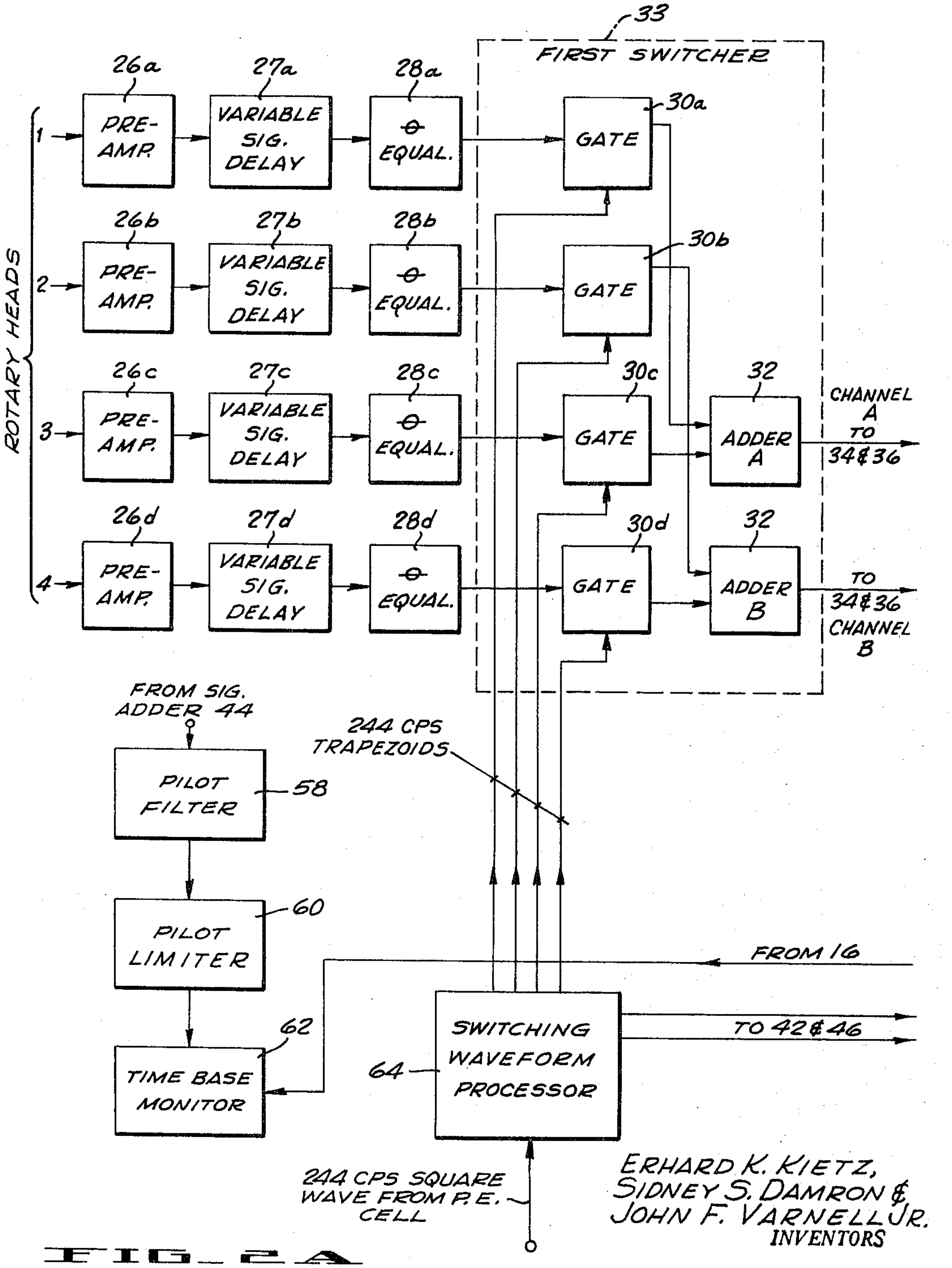
Figure 2B:
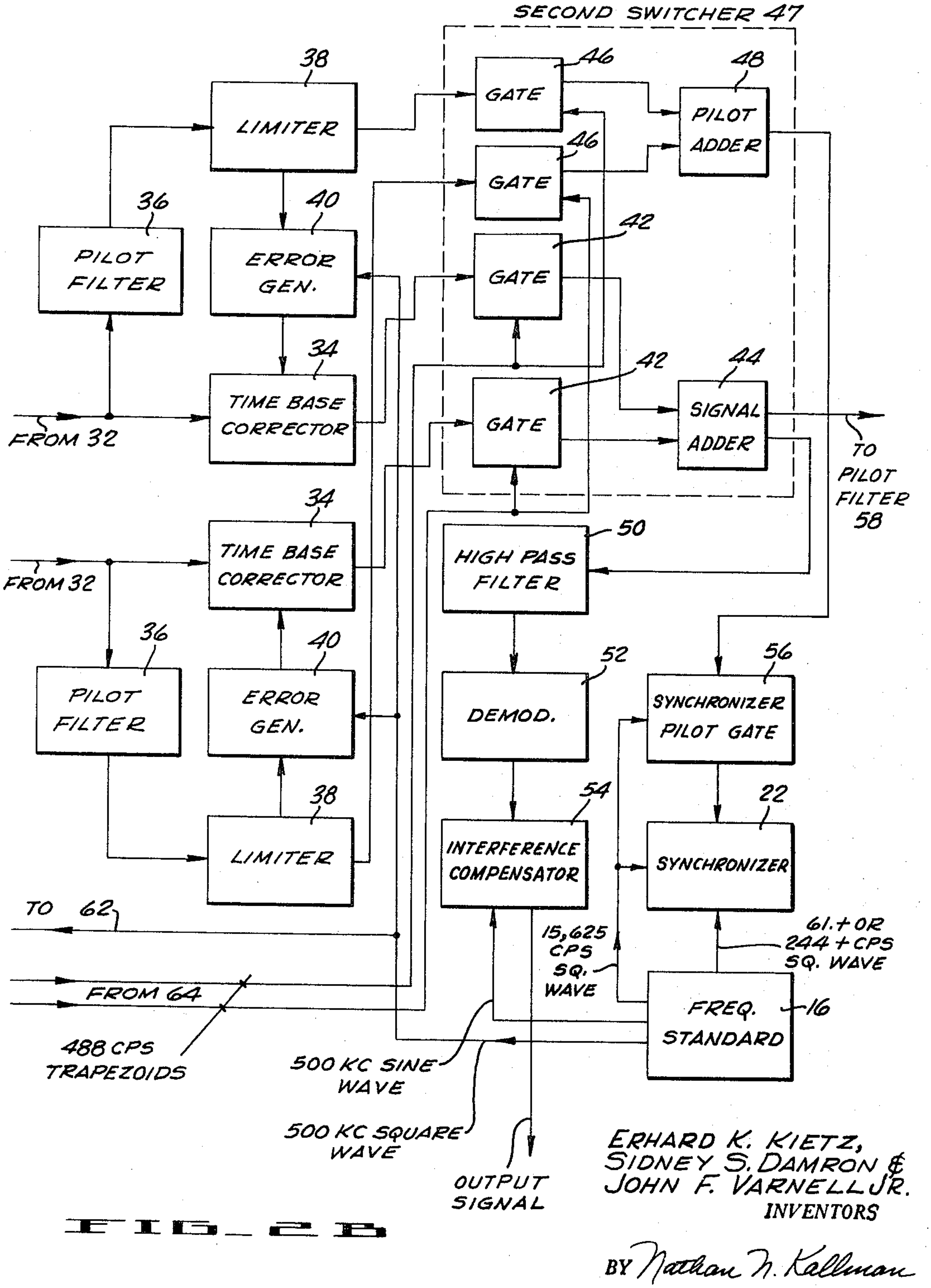

In FIGURES 2A and 2B, there is shown a magnetic tape playback system for use with the record system of FIGURE 1. Consecutive signal portions having overlapping information, such as shown in FIGURES 3*a–d* are derived from the composite recorded signal and applied to preamplifiers 26*a–d* after recovery from the magnetic medium or tape through the rotary magnet heads. The several signal portions each having components of the frequency modulated carrier wave and the pilot signal are passed through the preamplifiers 26*a–d* respectively to variable signal delays 27*a–d* wherein the pilot signal is separated from the frequency modulated (FM) waveform signal by suitable filtering means. The FM signal portion in each channel is subjected to an adjustable delay, and then the separated pilot signal is added to the adjusted FM signal again. The delay is applied to compensate for differences in the delay of the FM signals between the different head channels which originate from different response characteristics of the heads and head circuits in the region of the FM spectrum, while the head response is very uniform at the pilot frequency. Therefore, because the pilot is used later in the system for time base correction, step errors would appear in the FM signal without the delay correction performed in the variable signal delays 27*a–d*. Also, although it is not essential to add the pilot signal to the delayed FM signal for further processing, it is advantageous to have both signals processed in combination so that time base stability may be monitored continuously in the subsequent stages.

From the variable signal delays to 27*a–d*, the combined pilot and FM signals are directed to a phase equalizing network comprising a like plurality of phase equalizers 28*a–d*. Each phase equalizer 28, to be described in detail hereinafter, compensates for resonance effects of the magnetic head coupled to its respective channel, and corrects for other effects that tend to degrade the frequency and phase characteristics of the system. Thus, the output signal portions from each of the channel equalizers 28 are well matched such that each individual channel has a signal portion with properly related frequency, phase and amplitude characteristics.

Figure 3:
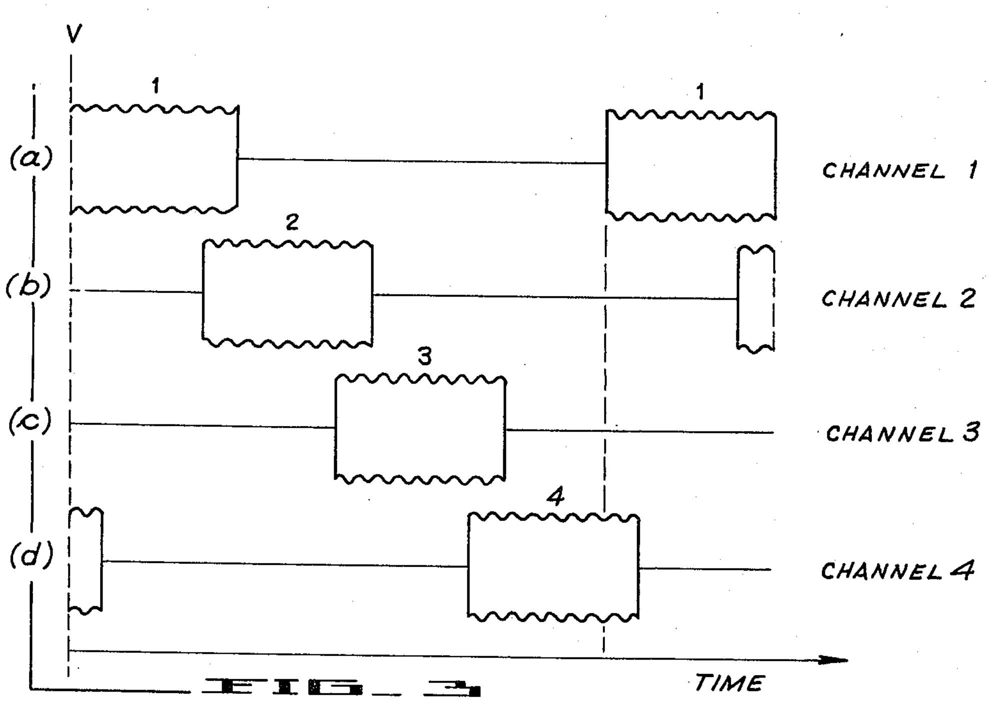
FIGURE 3 is a series of waveforms, *a–d*, illustrating the time relationship of the signal outputs from a plurality of magnetic heads in a magnetic tape apparatus.

The equalized signal portions are then derived from each of the phase equalizers 28*a–d* consecutively in the same time sequence as the signal portions are received from the rotary heads, as illustrated by the waveforms *a–d* in FIGURE 3. In a rotary head assembly system wherein transverse tracks of information are recorded and reproduced, there is a time overlap in adjacent channels that represents a duplication of information. Such duplicate information is subject to time displacement errors due to many causes in the record-playback process. These timing errors between identical portions of information in different head channels will cause a portion of the information signal to be either duplicated or lost upon reproduction, if the head channels are combined into a single signal channel by a conventional, fast acting switch. Also, when a fast acting switch is used any time base displacement or phase difference of two signal portions that are to be combined in time sequence may produce a relatively large and significant transient signal thereby distorting the reproduction information.

Figure 4:
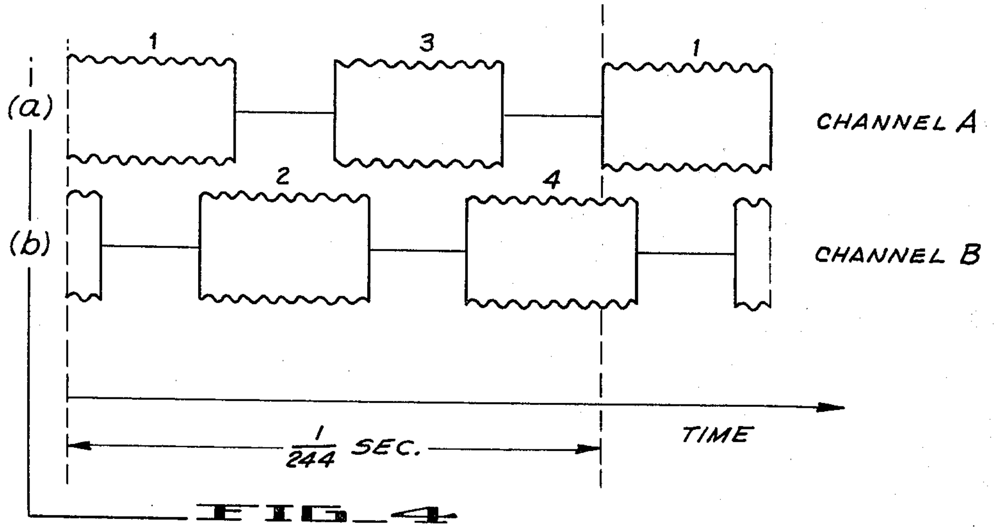
FIGURE 4 is a series of waveforms, *a* and *b*, illustrating the combined signal output from alternate magnetic heads.

The signal output from each phase equalizer 28 is combined by gating circuits 30*a–d* and adders 32 in a first switcher 33 into two separate channels A and B respectively, as indicated by FIGURES 4*a* and 4*b*. Channel A may contain time spaced signal portions that are derived from alternate heads on the rotary drum, say heads 1 and 3 spaced 180° apart; whereas channel B may carry signal portions that are received from heads 2 and 4 spaced 180° apart and 90° from heads 1 and 3 respectively. It should be understood that the structure from the adders 32 to the preamplifiers 26 may be broadly considered as means for reproducing the recorded combined frequency modulated signal and pilot signal.

In order to provide an additional degree of time base correction, an electronically variable delay network that adjusts for phase errors is provided for the two separate channels before the signal portions are combined into a single continuous output. Each channel A and B supplies a signal component containing the frequency modulated carrier wave and the pilot signal to a time base corrector 34, for example an electronically variable delay line (described hereinafter) that serves to provide vernier time base correction which may be in the order of millimicroseconds. Also, at the output of the adders 32 the pilot signal component is separated by pilot filters 36, such pilot signal having the same time base error as appears in the recorded and processed information signal. The separated pilot signals are then channeled through limiters 38 and applied to error signal generators 40 for comparison with a reference signal having a nominal frequency related to that of the pilot signal. The reference frequency signal, a 500 kilocycle per second square wave, may be derived from the frequency standard 16 and is phase compared with the separated pilot signal to provide an error voltage at the output of the error signal generators 40. The error signal voltage is then fed to the time base correctors 34 to provide a phase adjustment to the FM signal portion in each channel A and B.

The time corrected signal portions from channel A and B respectively are derived from the time base correctors 34 and applied to a pair of gating circuits 42 that operate in conjunction with a combining amplifier or signal adder 44 in a slow switcher 47, such as described in the aforementioned U.S. Patent application S.N. 97,051, now Patent No. 3,152,226. The signal portions from each channel A, B are thus combined into a continuous composite frequency modulated signal having a substantially constant amplitude, with no significant loss of signal information due to switching. Similarly, the separated pilot signal components are fed from the limiters 38 to pilot signal gates 46 which combine the two pilot signal components with the aid of a pilot adder 48.

The combined pilot and FM information signal is channeled from the signal adder 44 to a high pass filter or a band elimination filter 50 that suppresses the pilot frequency signal and passes the frequency modulated information signal only. The frequency modulated signal is then detected in a standard FM demodulator 52. To eliminate any spurious component of the pilot signal that may appear in the demodulated signal output, a compensating signal having an opposite phase to the spurious pilot component appearing in the demodulated signal is added thereto thereby cancelling any remanent portion of the pilot signal that may have passed through the high pass filter 50, or which originated as a cross-modulation product in the demodulator output due to nonlinearities of the system, mainly of the tape magnetization characteristics. This compensation is achieved in an interference compensator 54, to be described hereinafter.

Figure 5:
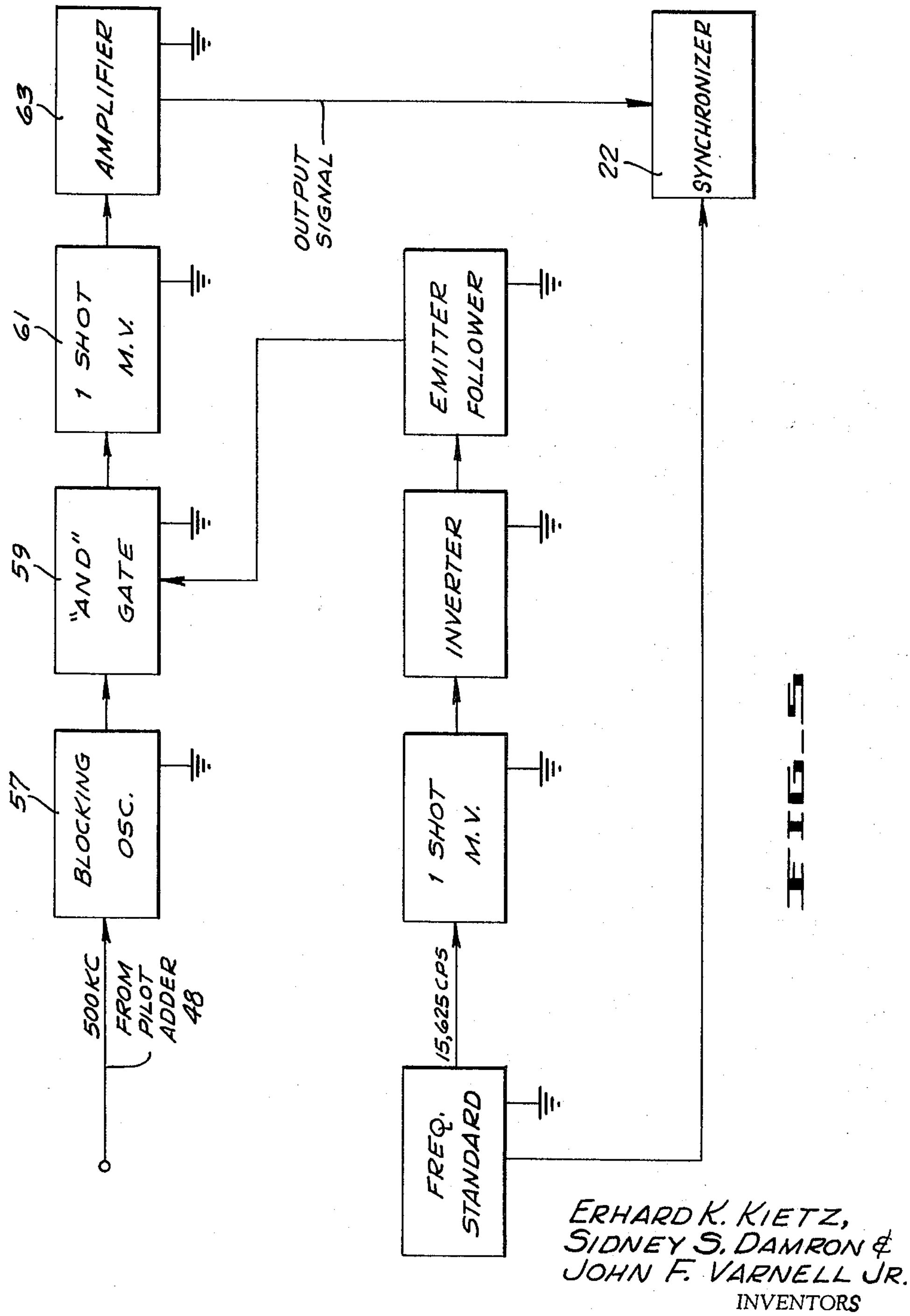
FIGURE 5 is a block diagram of a pilot gate used with the synchronizer, employed with this invention.

The output from the pilot adder 48 provides a 500 kilocycle signal that contains the same time base error that appears in the reproduced composite frequency modulated and pilot signal. The 500 kilocycle pilot signal derived from the pilot adder 48 is transformed in the pilot gate 56 to a 15,625 cycle per second synchronizing signal having the same timing information as the processed pilot signal. The 15,625 cycle per second synchronizing signal also has a pulse duration substantially the same as a reference synchronizing signal of the same frequency derived from the frequency standard 16 for application to the synchronizer 22 and the pilot gate 56. The pilot gate 56, shown in FIGURE 5, acts to differentiate the pilot signal derived from the pilot adder 48. The differentiated signal is applied through a blocking oscillator 57 to a gating circuit 59 that opens for approximately 3 microseconds at a frequency of 15,625 cycles per second, the gating pulse being derived from the frequency standard. The first pulse signal that passes the gating circuit 59 triggers a pulse generator or multivibrator 61 that produces a 15,625 cycle per second, 5 microsecond pulse that is applied through an amplifier 63 to the synchronizer 22 for the purpose of synchronization by adjustment of the angular velocities of the rotary elements associated with the transducing and tape driving assemblies. The pilot gate 56 is defined in greater detail in copending application S.N. 122,960, filed July 10, 1961, for Coleman and Palthe, now Patent No. 3,263,222, and assigned to the same assignee.

In order to monitor the system during playback, the combined FM and pilot signals at the output of the signal adder 44 is directed to a monitoring system comprising a pilot filter 58 that serves to separate the pilot signal. The pilot signal is channeled through a limiter 60 to a time base monitor 62 that compares the instantaneous phase of the pilot signal with a 500 kilocycle reference square wave derived from the frequency standard 16. The result of the phase comparison may be employed to indicate or present a visual display of any developed timing error by means of an oscilloscope, such as will be described hereinafter.

To provide the several gating signals that are employed to control the gates 30 in the first switcher 33, and the gates 42 and 46 in the second or slow switcher 47, a switching waveform processor 64 is utilized for generating such signals. A 244 cycle per second square wave that is derived from the rotating head assembly by means of a photoelectric cell is used to generate a pair of 244 c.p.s. square waves that are 90° out of phase and a 488 c.p.s. square wave. Each one of these three square waveforms drives a pair of ramp generators that produce two trapezoidal waveforms 180° out of phase. One of the pairs of 244 c.p.s. trapezoid waves is applied to the gates 30*a* and 30*c*, while the other 244 c.p.s. wave is applied to the gates 30*b* and 30*d*. Also, the 488 c.p.s. pair of trapezoid waves is directed to the gates 42 and 46. The trapezoid generating circuit of the waveform processor 64 will be described in greater detail hereinafter.

*Pilot adder*

Figure 6:
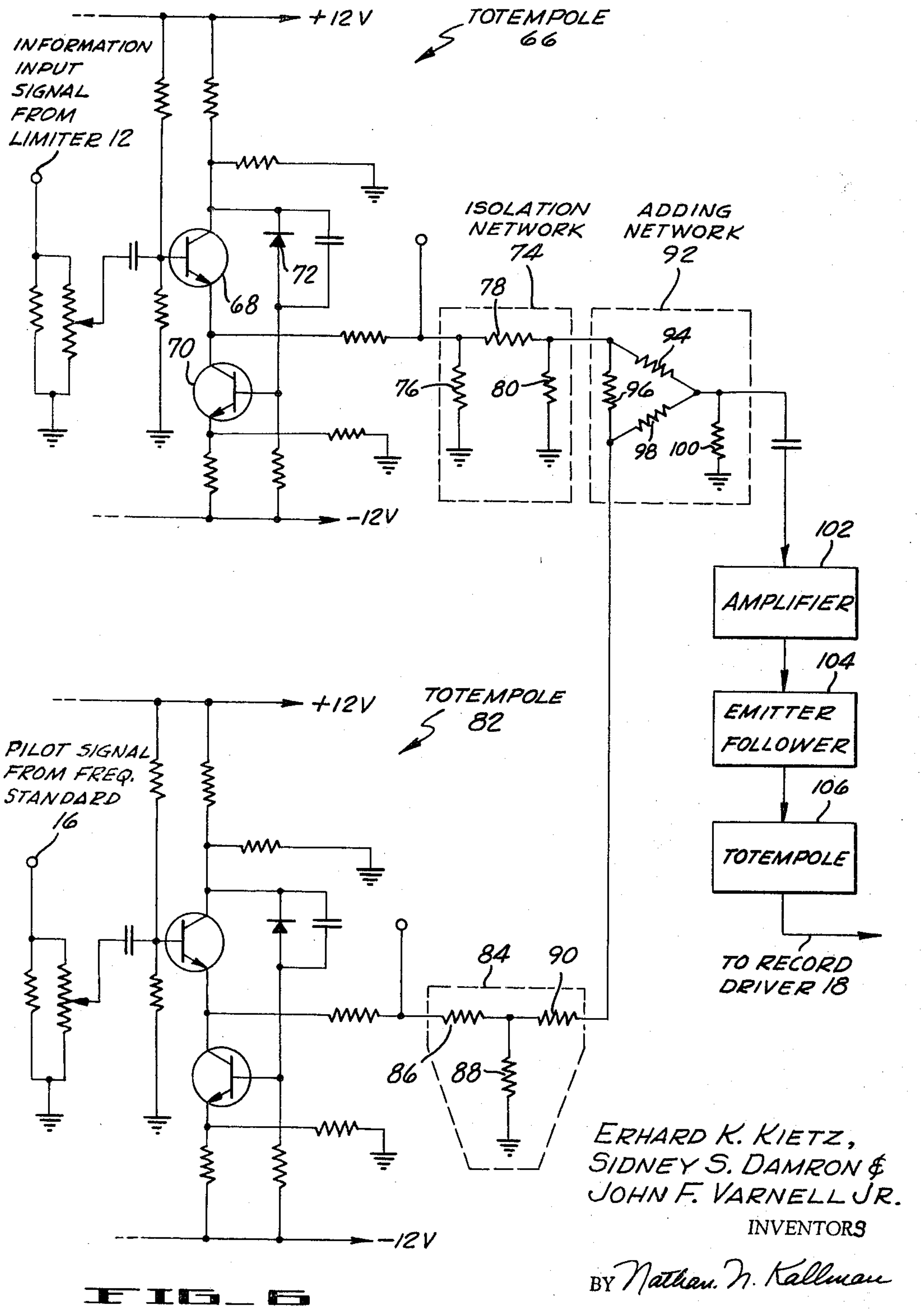
FIGURE 6 is a schematic and block diagram of an adder circuit, such as employed with the recording system of FIGURE 1.

FIGURE 6 is a schematic circuit of a pilot adder 14 such as used with the recording apparatus of FIGURE 1. The information input signal is applied to an impedance matching totem pole stage 66 comprising a pair of NPN transistors 68 and 70 connected in series, and a Zener diode 72 coupled to the collector and base of transistors 68 and 70 respectively. The modulated signal is then fed to an isolation stage 74 comprising a pi network formed with resistors 76, 78 and 80.

At the same time, the pilot signal derived from the frequency standard 16 is passed through a totem pole stage 82 similar to the totem pole 66 to an isolation stage 84 comprising an attenuator T-pad formed by resistors 86, 88 and 90. The pilot signal and the FM modulated information signal are then directed to an adding stage 92 comprising a delta network including resistors 94, 96, 98, and 100. Thereafter the combined signal is amplified by an amplifier 102, and channeled through an emitter follower 104 and a totem pole stage 106 to the record driver 18, shown in FIGURE 1.

*Phase equalizer*

Figure 7:
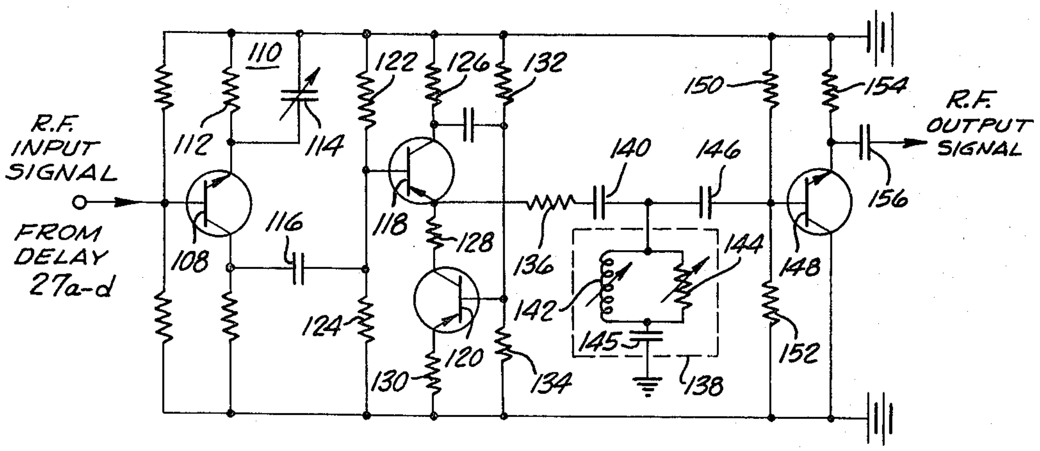
FIGURE 7 is a schematic diagram of a phase equalization circuit used in the reproduce system of FIGURES 2A and 2B.

An embodiment of a phase equalizer circuit 28*a–d* that compensates for phase nonlinearity and amplitude distortion caused by head resonance is shown in FIGURE 7.

The head circuit is generally a tuned LCR circuit and compensation for phase and amplitude distortion may be achieved by including in each radio frequency reproduce channel a compensating network that has phase and amplitude response complementary to the phase and amplitude response of the reproduce head circuit. This compensating network is an LCR circuit having variable Q and resonant frequency.

In FIGURE 7, the uncompensated radio frequency input signal is derived from the variable signal delay 27*a–d* and applied to the base of a transistor 108, which is a conventional amplifier stage with variable emitter peaking. A time constant network 110 is coupled to the emitter of the transistor 108, and comprises a resistor 112 and a variable capacitor 114. The time constant of this network may be varied by adjusting the variable capacitor 114 so that the correct amplitude response tilt and proper phase correction may be obtained. The amplifier signal that has been partially compensated for by the time constant network 110 is coupled from the collector of the transistor 108 through a coupling capacitor 116 to the base of a transistor 118. The transistor 118 is part of a conventional totem pole isolation stage that also includes a transistor 120 and resistors 122, 124, 126, 128, 130, 132 and 134. This isolation stage has a high input impedance and a low output impedance. A resistor 136 that is coupled between the emitter of the transistor 118 and an amplitude and phase correction circuit 138 serves to raise the output impedance to provide proper isolation between the ungrounded side of the correction circuit 138 and a point of reference potential, such as ground. A capacitor 140 serves as a DC blocking and coupling capacitor to couple the radio frequency signal to the amplitude and phase correction network 138.

The amplitude and phase correction network 138 comprises a variable inductance 142, variable resistor 144, and fixed capacitor 145 that provide additional compensation for the amplitude response and phasing of the processed signal. The output signal that is derived from the compensation network 138 is then coupled through a capacitor 146, which is a D.C. blocking and coupling capacitor, to the base of a transistor 148. The transistor 148 together with biasing resistors 150 and 152 and emitter resistor 154 comprise a conventional emitter follower stage. The output signal is derived from the emitter follower through a capacitor 156 and is then directed to the first switcher 33.

*Time base corrector*

Figure 8:
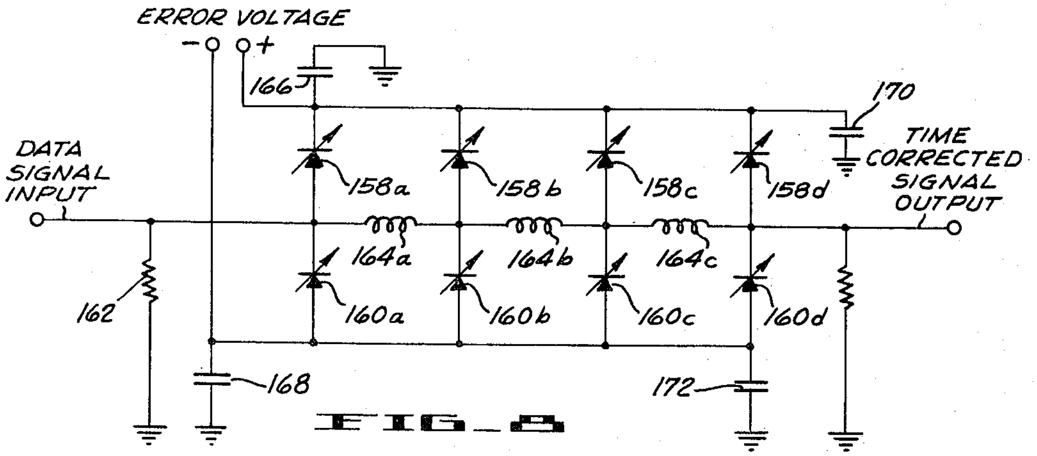
FIGURE 8 is a schematic diagram of a time base correction circuit, utilized with the same reproduce system.

In FIGURE 8, an embodiment of a time base corrector 34, such as an electronically variable delay line, is shown wherein a plurality of voltage variable capacitors 158*a–d* and 160*a–d* are coupled in a balanced configuration forming a lumped parameter line. The capacitances of the voltage variable capacitors 158 and 160 may be changed in accordance with a control voltage that may be applied thereto in push-pull. In operation, the data signal that is being processed is derived from the adders 32 and applied through a termination resistor or resistive load 162 to a bus carrying a series of inductances 164*a, b, c*. Each inductance 164 is coupled between two pairs of voltage controlled capacitors 158 and 160, each pair comprising a balanced configuration wherein the anode of the first voltage controlled capacitor 158 is coupled to the cathode of the second controlled capacitor 160.

In operation, the information signal is passed through the delay line 34 to provide a signal output having a fixed delay relative to the input signal. However, whenever an error voltage is applied from the error generator 40 to the variable delay line 34, the fixed delay is varied in accordance with such voltage, such error voltage being approximately proportional to the fourth power of change in the fixed delay. Any increase in the error voltage decreases the lumped capacitance and the extent of delay. The error voltage may be applied in push-pull to the cathodes of the capacitors 160 and to the anodes of the capacitors 158. Bypass capacitors 166–172 are coupled between the voltage controlled capacitor network and a reference potential such as ground, and the time constants formed by these capacitors 166–172 in conjunction with the source of impedance of the error voltage are factors in circumscribing the rate of change of the impressed delay.

The number of balanced sections of voltage variable capacitors 158 and 160 and inductors 164 serves to determine the magnitude of the fixed delay, and an increased number increases such fixed delay and also affords a greater variation in the range of such adjusted delay. By virtue of the balanced system, the opposing voltage controlled capacitors in each pair act to cancel the effects of any voltage change that may be caused by the information signal alone. Only the error control voltages derived from the error generators 40 cause a change in the delay of the signal output.

*Interference compensator*

Figure 9:
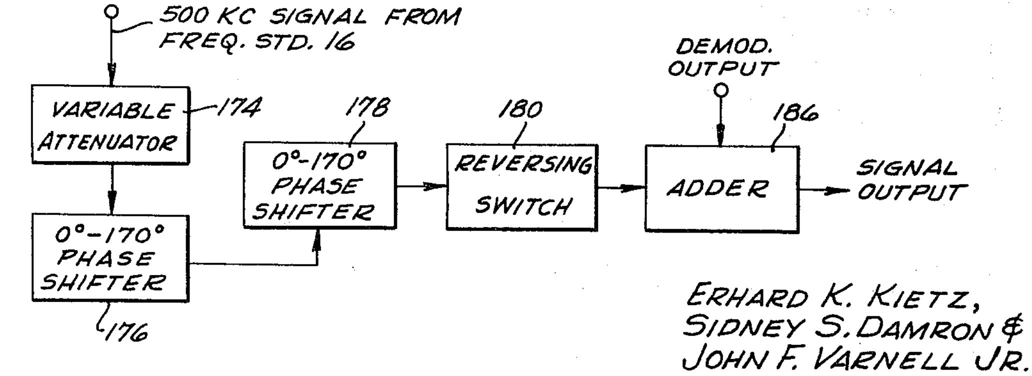
FIGURE 9 is a block diagram of an interference compensator that is incorporated in the inventive system.
Figure 10:
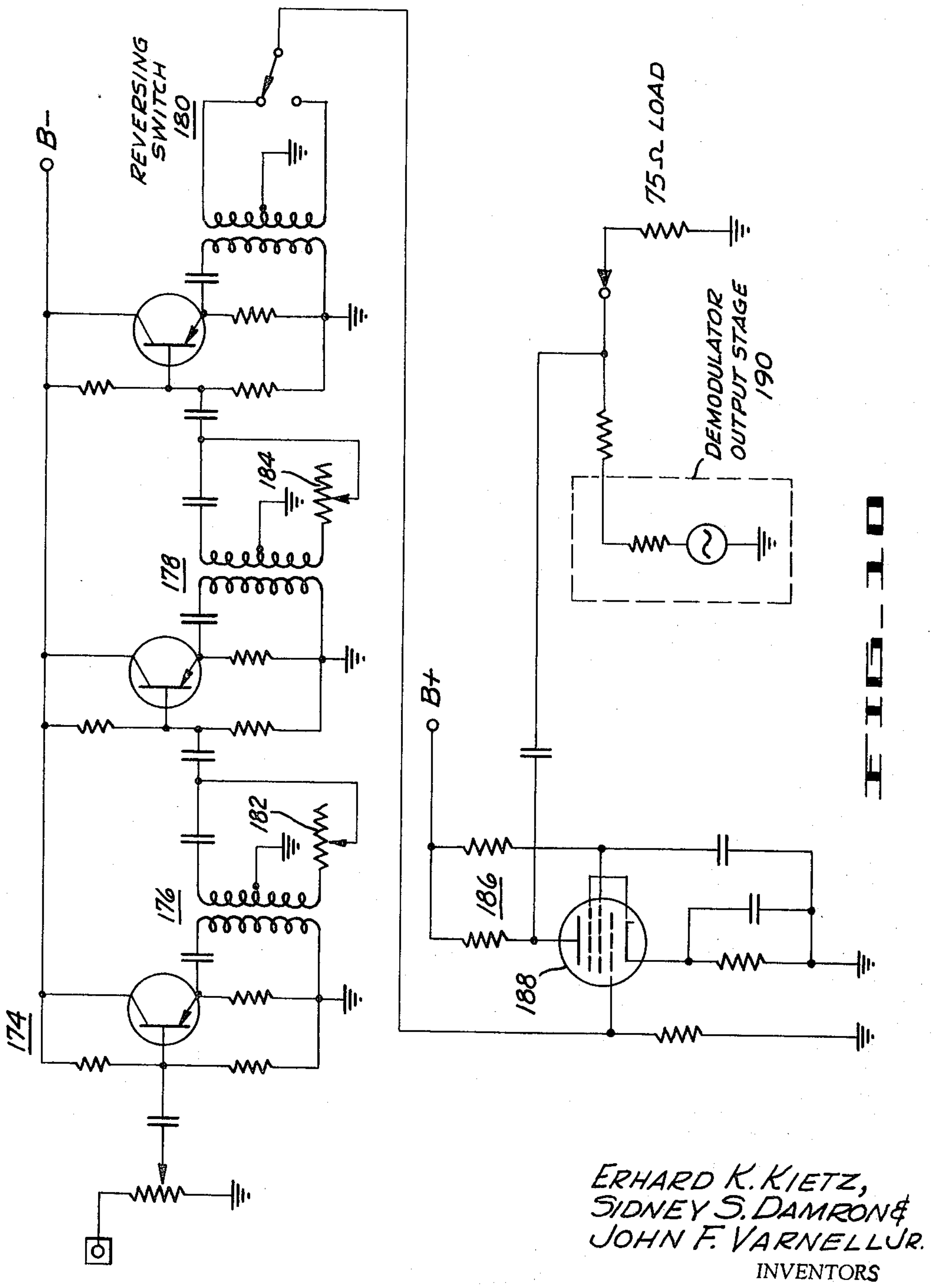
FIGURE 10 is a schematic circuit diagram of the interference compensator shown in FIGURE 9.

The interference compensator 54, shown in FIGURES 9 and 10, serves to cancel out any undesirable component of the 500 kilocycle pilot signal that may be present in the output signal of the demodulator 52. The cancellation of such interference is achieved by the use of a variable attenuator 174 that adjusts the amplitude of a 500 kilocycle signal that is derived from the frequency standard 16 for compensation by matching the amplitude of the interfering signal that may be viewed on an oscilloscope. The attenuated signal is then channeled through a series of adjustable phase shifters 176, 178, each being capable of shifting the phase of the cancellation signal from 0–170°. The phase shifters 176 and 178 serve to match the phase of the compensating signal derived from the frequency standard 16 so that the compensating is in phase opposition to the interfering signal. Each of the phase shifters 176, 178 provide a partial phase shift, but together do not account for a total 360° phase shift which would be necessary to match the cancellation signal to any possible phase condition of the interfering signal. Therefore, a reversing switch 180 is provided to produce a 180° phase shift so that in combination with adjustments by the variable potentiometers 182 and 184 of the phase shifters 176 and 178 respectively, any degree of phase shift from 0° to 360° may be achieved. When the suitable compensating signal has been established so that it is in antiphase to the interfering signal, the compensating signal is applied to an adder 186 that may comprise a pentode vacuum tube 188 coupling the phase shifting network to the demodulator output stage 190. The compensating signal is thus added to the output signal so that any spurious pilot signal components are substantially eliminated and only the information signal that has been recorded is derived for further utilization. As an alternative, a variable delay line may be employed to achieve the phase adjustment, in lieu of the two phase shifters 176, 178 and the reversing switch 180.

*Switching waveform processor*

The necessary waveforms that are supplied to the gates 30*a–d* in the first switcher 33 and to the gates 42 and 46 in the slow switcher 47 are derived from the switching waveform processor 64. One embodiment of the waveform processor 64, represented in the block diagram of FIGURE 11, comprises a primary phase shifter 192 that receives a 244 c.p.s. square wave signal (FIGURE 12*a*) from the photoelectric cell that senses the position of the rotary head drum in the magnetic tape apparatus. The square waveform signal is delayed in the phase shifter 192 and the delayed signal (FIGURE 12b) is supplied to a 244 c.p.s. low pass filter 194 that converts the square waveform to a sinusoidal signal, such as shown in FIGURE 12*c*. After inversion of the sinusoidal signal by an inverting amplifier 196, the inverted signal (FIGURE 12*d*) is directed to a squaring amplifier 198 that supplies a pair of square waveform signals; one of the signals is shown in FIGURE 12*e*, the other one being in antiphase to the one shown. The waveforms are converted in trapezoid generators 200 and 202 respectively to a pair of trapezoids, one shown in FIGURE 12*f*, the other being in antiphase to it.

At the same time the output from the inverting amplifier 196 is passed through an RC phase shifter 204 and the phase shifted signal (FIGURE 12*g*) is supplied to a second squaring amplifier 206 that provides a similar pair of 244 c.p.s. square waves (FIGURE 12*h*) to another pair of trapezoid generators 208 and 210. However, this second pair of square waves is 90° out of phase relative to the 244 c.p.s. square waves (FIGURE 12*e*) supplied to the first pair of trapezoid generators 200 and 202, by virtue of the phase shifter in the RC phase shifter 204.

Figure 11:
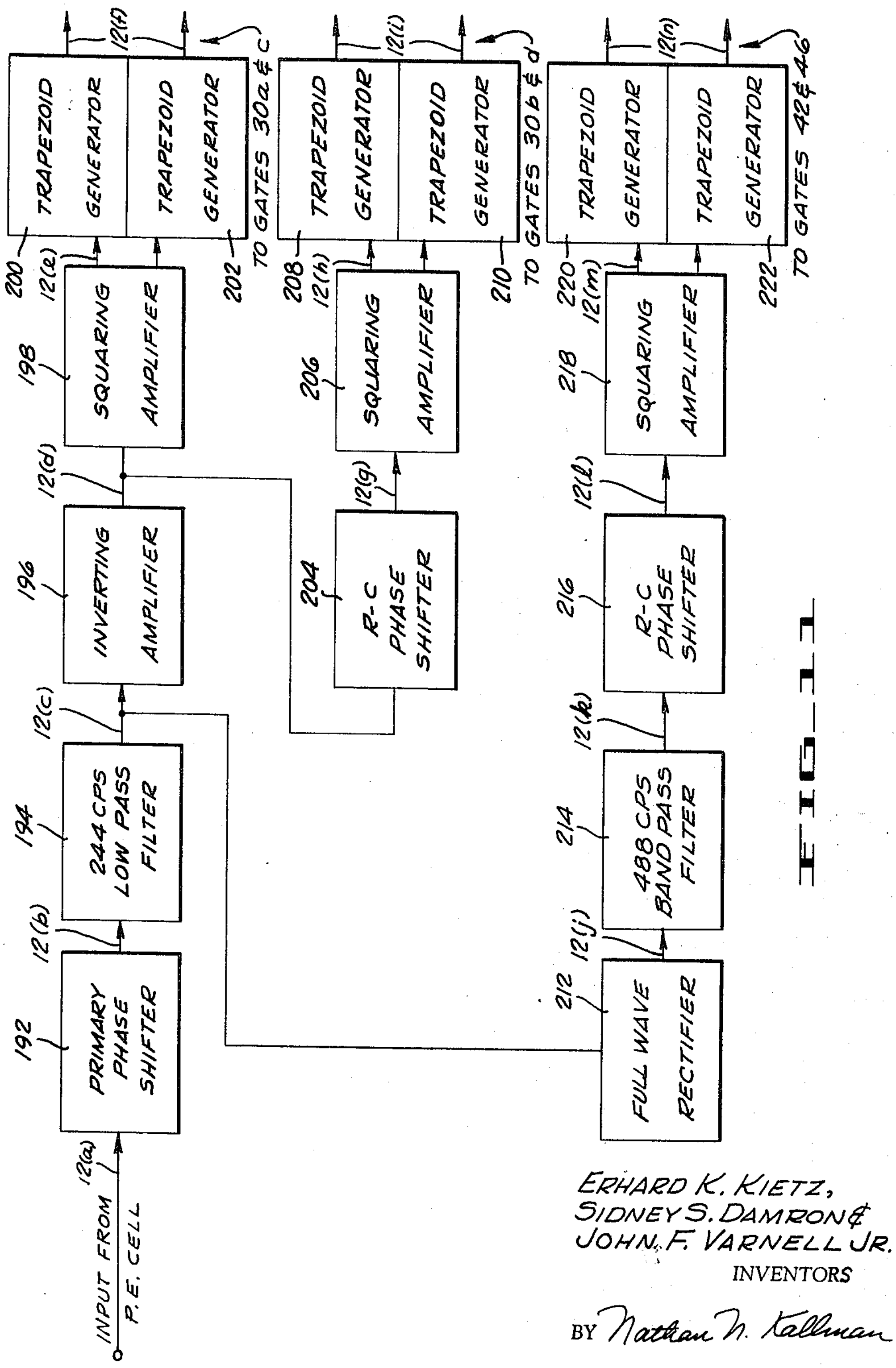
FIGURE 11 is a block diagram of a switching waveform processor supch as used with the gating circuit of the inventive system.
Figure 12:
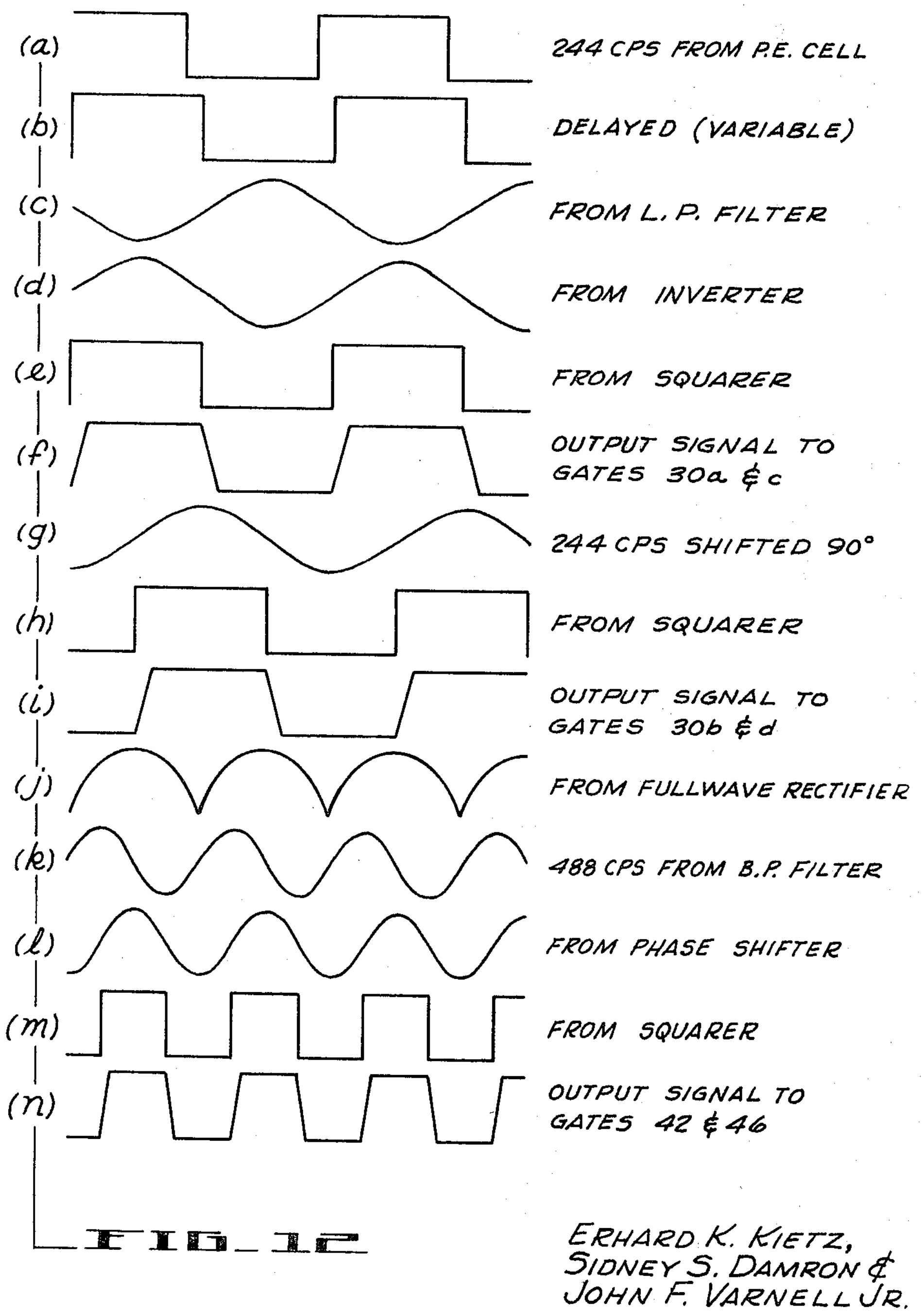
FIGURE 12 is a series of waveforms representing the development of the gating signals for the gates incorporated in the switchers of the system.

The output (FIGURE 12*c*) from the low pass filter 194 is also channeled through a full wave rectifier 212, and the rectified signal (FIGURE 12*j*) is passed through a 488 c.p.s. bandpass filter 214 and an RC phase shifter 216 to a third squaring amplifier 218. The output (FIGURE 12*m*) from the squaring amplifier 218 provides a pair of 488 c.p.s. square signals to a third pair of trapezoid generators 220 and 222. The trapezoid generators 200, 202, 208, 210 provide trapezoidal waveform signals of 244 c.p.s. to the gates 30*a–d* in the first switcher 33. The trapezoid generators 220 and 222 provide waveforms to the gates 42 and 46 of the second switcher 47. The various waveforms that are developed by the circuit of FIGURE 11 are shown in FIGURE 12.

*Trapezoid generator*

Figure 13:
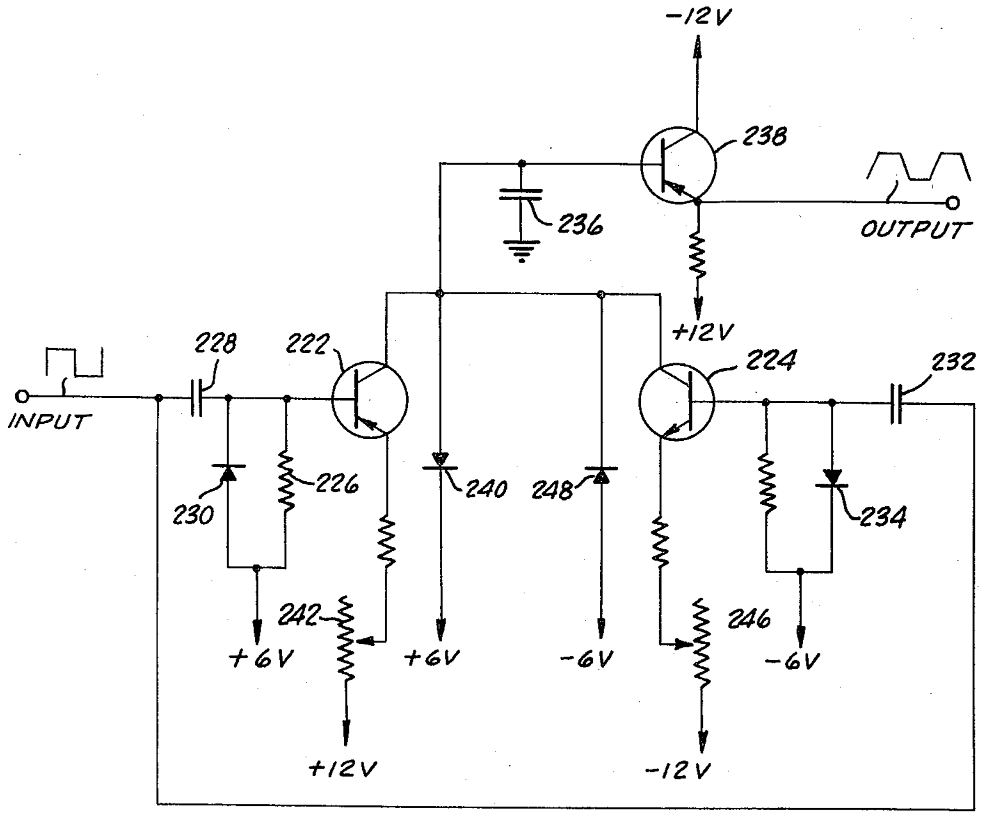
FIGURE 13 is a schematic circuit of a trapezoid generator that may be used with the switching waveform processor of FIGURE 11.

One form of trapezoid generator, such as employed with the switching waveform processor 64, is illustrated in FIGURE 13. In operation, an input signal is applied in the form of a symmetrical square wave of 244 or 488 c.p.s. The square waves are derived from the photoelectric cell which senses the position of the head drum. The photocell signal is processed in the switching waveform processor to furnish the symmetrical square waves in proper phase relationship to the trapezoid generators, as described in the chapter, "Switching Waveform Processor." In the quiescent state, a pair of transistors 222 and 224 are conducting, and if both transistors conduct equally, the voltage at a junction point between the collector of transistor 222 and the collector of transistor 224 is zero. Coupled to the base of the transistor 222 is a clamping circuit comprising a capacitor 228 and a diode 230 that clamps the incoming signal at its negative peak level. Similarly, a clamping circuit comprising a capacitor 232 and a diode 234 are coupled to the base of the transistor 224 to clamp the input signal that is applied to the base of the transistor 224 at its positive peak level. Transistors 222 and 224 conduct when their base potentials are at the negative peak level and positive peak level respectively. The current derived from the transistor 222 charges a capacitor 236 that is coupled to the collector of transistor 222 in a positive direction. At such time as transistor 222 is conducting, transistor 224 is cut off, and vice versa. When the transistor 224 conducts, however, the capacitor 236 is charged in a negative direction. Since the current derived from transistor 222 or transistor 224 is constant, the rise or fall in voltage that appears at the capacitor 236 is linear. At the junction of the collectors of transistors 222 and 224 there is also connected the anode of a diode 240 and the cathode of a diode 248. The cathode of diode 240 is connected to a positive potential (in the diagram +6 v.) and the anode of diode 248 is connected to a negative potential (—6 v. in the diagram). When the voltage on the capacitor 236 approaches the positive potential on the cathode of diode 240, any further increase of capacitor voltage is prevented, i.e., the diode catches the capacitor voltage. When the voltage on the capacitor 236 approaches the negative potential on the cathode of diode 248, any further (negative) increase of the capacitor voltage is prevented, due to the catching action of diode 248.

The capacitor 236 is coupled to an emitter follower transistor 238. The emitter follower presents a high impedance to the capacitor 236 but is capable of driving succeeding low impedance circuits. The output of the emitter follower 238 is identical to the voltage waveform on capacitor 236, which is a trapezoidal waveform.

By means of the variable resistors 242 and 246, the emitter current of transistors 222 and 224 may be varied. The adjustment of the resistors 242 and 246 thus may be used to vary the slopes of the trapezoid waveform derived at the output within ±20%. The amplitude of the output signal may be set by the bias voltage supplied to the diodes 240 and 248. The value of the capacitor 236 determines the extent of the slope or ramp.

*Time base monitor*

Figure 14:
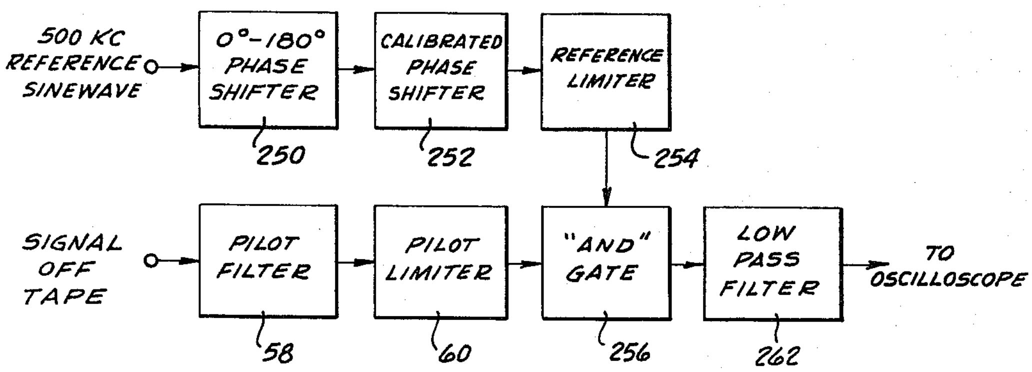
FIGURE 14 is a block diagram of a time base monitor system, such as may be employed with the invention.

The time base monitor 62 is employed to measure residual time or phase variations of the pilot signal (derived from the output of the signal adder 44 in the slow switcher 47) with respect to a 500-kc. reference frequency (derived from the frequency standard 16). The time base monitor 62, as shown in FIGURE 14, has two inputs for this purpose: (1) a 500-kc. reference frequency in the form of a sine wave, and (2) the signal derived from the adder 44 in the slow switcher 47, which is a composite, time base corrected signal comprising the FM-modulated information signal and the pilot. Because both the FM signal and the pilot have been subjected to time base correction simultaneously, the residual time base error of the pilot as measured in the time base monitor by means of phase comparison against a reference frequency, represents the residual error in the FM signal and, therefore, also the residual error in the demodulated output information.

In operation, the 500-kc. reference frequency is applied to the phase shifter 250 which allows adjustment of the average phase difference between the pilot and reference signals to either 90° or 270°. This results in adjusting the output signal of the time base monitor to the center of the possible monitoring range which extends either from 0° to 180°, or from 180° to 360° (see FIGURE 16*d*).

The phase-adjusted reference signal is then applied to a calibrated phase shifter 252 which may consist of a fixed delay line that may be switched in and out of the circuit. By this means it is possible to calibrate any indicating instrument connected to the output of the time base monitor (an oscilloscope, for example) directly in nanoseconds (millimicroseconds) of residual error.

The reference signal is then routed through a limiter 254 and applied to the AND gate 256.

At the same time, the composite signal from the output of the adder 44 in the slow switcher 47, i.e., the FM-modulated information signal plus the pilot, is applied to the pilot filter 58 which suppresses the FM signal and passes the pilot only. The pilot is limited in the pilot limiter 60 and applied to the second input of the AND gate 256. The output of this gate is passed through a low-pass filter 262 which suppresses components of 500 kc. and higher frequencies and passes only the D.C. component of the gate output which will vary according to the phase modulation of the pilot due to residual time base errors. Thus, the output voltage of the low pass filter 262 represents the residual time base error.

Figure 15:
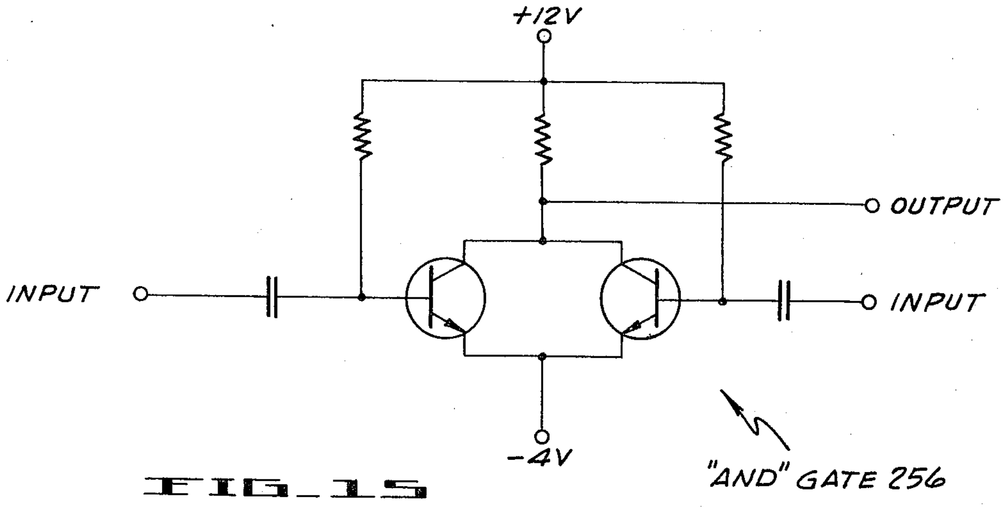
FIGURE 15 is a schematic diagram of a gating circuit used with the time base monitor of FIGURE 14.
Figure 16:
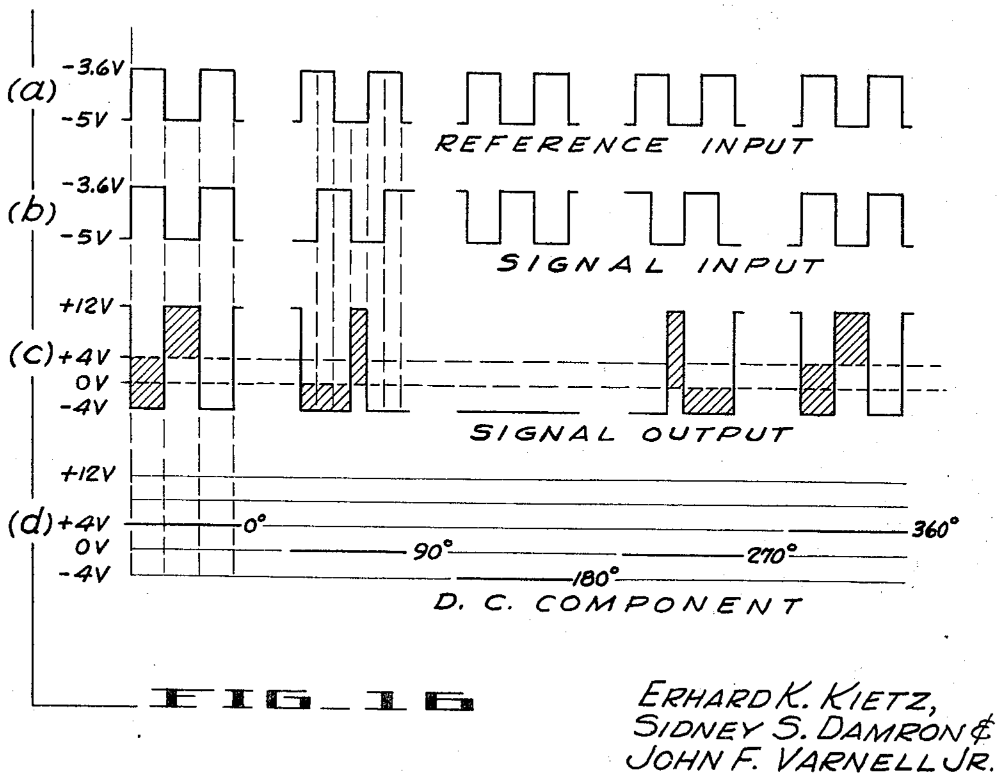
FIGURE 16 shows a series of waveforms, *a–d*, that apply to the operation of the time base monitor.

The AND gate, as shown in FIGURE 15, comprises a pair of n-p-n transistors that are emitter coupled, and which are driven from cut-off to saturation in a very short time by the square waves which are derived from the reference limiter 254 and the pilot limiter 60, respectively, and which are applied as input signals to the AND gate at both the bases of the transistors. These input signals are drawn in FIGURES 16*a* and 16*b* for various relative phase relationships. The resulting signals at the gate output are shown in FIGURE 16*c*, while FIGURE 16*d* shows the correspondent signals at the output of the low pass filter 262.

The time base monitor allows the observation of the time base stability of the entire playback system during normal operation. The time base monitor is also a very useful means for adjusting the various controls during system checkout and during operation to keep the residual time base errors at a minimum.

There has been described herein a magnetic tape apparatus for recording and reproducing a continuous wide-band signal that is substantially free of transients and that affords a high degree of time base stability.

What is claimed is:

1. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal from the magnetic medium by means of said plurality of magnetic heads, each head consecutively sensing a portion of the continuous recorded signal, said signal portions being processed in separate head channels; means for equalizing the phase relationships of the signal portions in each channel relative to each other, means for separating the pilot signal component from the signal portions in each of said channels coupled to the equalizing means; comparator means for comparing the phase of such pilot signal components with the phase of a reference signal to develop error signals, coupled to said separating means; time base correction means coupled to said comparator means for adjusting the phase of the processed signal portions in response to the error signals; switching means for effectively combining the phase adjusted signal portions into a continuous signal; and a demodulator for detecting the combined phase adjusted signal.

2. The combination of claim 1, wherein the switching means includes a section for combining the separated pilot signal into a continuous pilot signal, further characterized in that a synchronizer is coupled to the switching means and to a source of reference frequency signals for developing control signals to synchronize the tape apparatus in accordance with the pilot signal.

3. A magnetic tape apparatus for reproducing a continuous frequency modulated information signal recorded on a magnetic medium additively with a pilot signal, wherein a rotary assembly having a plurality of magnetic heads senses the combined signal recorded on the magnetic medium, such medium being driven by a rotating capstan comprising: means for deriving the recorded signal from the magnetic medium by means of said plurality of magnetic heads, each head consecutively sensing a portion of the continuous recorded signal, said signal portions being processed in separate head channels; a plurality of variable signal delays, each delay being coupled to a head channel; a like plurality of phase equalizers coupled to the output of said variable signal delays; a switching network including gating circuits for channeling the processed signal portions into two channels coupled to said phase equalizers; means for separating the pilot signal component from the signal portions in each of said two channels coupled to the output of said switching network; comparator means for comparing the phase of such pilot signal components with the phase of a reference signal having the same frequency as the pilot signal to develop error signals; time base correction means coupled to said comparator means and to said switching network for receiving the processed signal portions and for adjusting the phase thereof in response to the error signals; slow switching means for combining the phase adjusted signal portions into a continuous signal; and a demodulator for detecting the phase adjusted continuous signal.

4. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal from the magnetic medium by means of said plurality of magnetic heads, each head consecutively sensing a portion of the continuous recorded signal, said signal portions being processed in separate head channels; a plurality of variable signal delays, each delay being coupled to a head channel; a like plurality of phase equalizers coupled to said variable signal delays; a switching network including gating circuits for providing only two channels of signal portions coupled to said phase equalizers; a switching waveform processor for providing gating signals to said switching network in accordance with the angular velocity of the rotary head assembly; means for separating the pilot signal component from the signal portions in each of said two channels coupled to the output of said switching network; comparator means for comparing the phase of such pilot signal components with the phase of a reference signal having the same frequency as the pilot signal to develop error signals; time base correction means coupled to said comparator means and to said switching network for receiving the processed signal portions and for adjusting the phase thereof in response to the error voltages; slow switching means for combining the phase adjusted information signal portions into a continuous signal; and a demodulator for detecting the phase adjusted continuous signal.

5. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded information signal from the magnetic medium by means of said plurality of magnetic heads, each head effectively sensing a different portion of the continuous recorded signal, said signal portions being processed in separate head channels; a plurality of variable signal delays, each delay being coupled to a head channel; a like plurality of phase equalizers coupled to said variable signal delays; a switching network including gating circuits for providing only two channels of information signal portions coupled to said phase equalizers; a switching waveform processor for providing gating signals to said switching network in accordance with the angular velocity of the rotary head assembly; pilot filter means for separating the pilot signal component from the signal portions in each of said two channels coupled to the output of said switching network; comparator means for comparing the phase of such pilot signal components with the phase of a reference signal having the same frequency as the pilot signal to develop error signals; time base correction means coupled to said comparator means and to said switching network for receiving the processed information signal portions and for adjusting the phase thereof in response to the error signals; slow switching means for combining the phase adjusted information signal portions into a continuous signal; a demodulator for detecting the phase adjusted continuous signal; and an interference compensator means coupled to said demodulator for substantially eliminating any pilot signal component from the demodulated signal.

6. The combination of claim 5 wherein the slow switching means includes a section for combining the separated pilot signal components of each channel, further characterized in that a synchronizer is coupled to the slow switching means and to a source of reference frequency signals for developing signals to synchronize the tape apparatus in accordance with the pilot signal.

7. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded information signal from the magnetic medium by means of said plurality of magnetic heads, each head effectively sensing a different portion of the continuous recorded signal, said signal portions being processed in separate head channels; a plurality of variable signal delays, each delay being coupled to a head channel; a like plurality of phase equalizers coupled to said variable signal delays; a switching network including gating circuits for providing only two channels of information signal portions coupled to said phase equalizers; a switching waveform processor for providing gating signals to said switching network in accordance with the angular velocity of the rotary head assembly; means for separating the pilot signal component from the signal portions in each of said two channels coupled to the output of said switching network; comparator means for comparing the phase of such pilot signal components with the phase of a reference signal having the same frequency as the pilot signal to develop error signals; time base correction means coupled to said comparator means and to said switching network for receiving the processed information signal portions and for adjusting the phase thereof in response to the error signals; slow switching means for combining the phase adjusted information signal portions into a continuous signal; a demodulator for detecting the phase adjusted continuous signal; and a monitoring means for displaying the phase of the processed signal with reference to a standard signal.

8. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal from the magnetic medium by means of said plurality of magnetic heads, each head consecutively sensing a portion of the continuous recorded signal, said signal portions being processed in separate head channels; means for correcting the phase of the signal portions in each head channel, said means for correcting operatively coupled to said means for deriving the recorded signal; means for combining the phase adjusted signal portions into a continuous signal, said means for combining operatively coupled to said means for correcting, whereby said signal portions in each head channel are combined without any significant loss of information; and a demodulator for detecting the phase adjusted continuous signal.

9. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal including the pilot signal from the magnetic medium by means of said plurality of magnetic heads, said signal portions being processed in separate head channels; means for correcting the phase of the signal portions in each head channel, said means for correcting operatively coupled to said means for deriving the recorded signal; means for combining the phase adjusted signal portions into a continuous signal, said means for combining operatively coupled to said means for correcting, whereby said signal portions in each head channel are combined without any significant loss of information; and means for synchronizing the tape apparatus in accordance with the derived pilot signal.

10. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal including the pilot signal from the magnetic medium by means of said plurality of magnetic heads, said signal portions being processed in separate head channels; means for correcting the phase of the signal portions in each head channel, said means for correcting operatively coupled to said means for deriving the recorded signal; means for combining the phase adjusted signal portions into a continuous signal, said means for combining operatively coupled to said means for correcting, whereby said signal portions in each head channel are combined without any significant loss of information; means for synchronizing the tape apparatus in accordance with the derived pilot signal, said synchronizing means including a frequency standard for providing a reference signal.

11. A magnetic tape apparatus for reproducing a continuous frequency modulated information signal recorded on a magnetic medium additively with a pilot signal wherein a rotary assembly having a plurality of magnetic heads senses the combined signal recorded on the magnetic medium, such medium being driven by a rotating capstan comprising: means for deriving the recorded signal including the pilot signal from the magnetic medium by means of said plurality of magnetic heads, said signal portions being processed in separate head channels; means for correcting the phase of the signal portions in each head channel, said means for correcting operatively coupled to said means for deriving the recorded signal; means for combining the phase adjusted signal portions into a continuous signal, said means for combining operatively coupled to said means for correcting, whereby said signal portions in each head channel are combined without any significant loss of information; means for demodulating the combined phase adjusted continuous signal; an interference compensator coupled to said demodulating means for substantially eliminating any component of the pilot signal from the demodulated signal.

12. In a magnetic recording and reproducing apparatus for recording continuous wideband signals on a magnetic medium, said apparatus comprising: a magnetic head assembly means for transmitting signals to and from said magnetic medium; said head means operatively coupled to said magnetic medium and having a plurality of heads that are successively coupled to said magnetic medium, whereby a portion of the continuous information is transmitted by each of said heads; a capstan for driving said magnetic medium; means for generating a pilot signal; means for modulating a carrier signal with an information signal; means for combining said pilot signal with said information signal; said means for combining operatively coupled to said pilot signal generating means; means for applying said combined signal to said magnetic head means, whereby said combined signal is recorded onto said magnetic medium; means for reproducing said combined signal from said magnetic medium, said means for reproducing operatively coupled to said plurality of heads of said head means; means for separating said pilot signal from said modulated signal, said means for separating operatively coupled to said means for reproducing; means for generating an error signal by comparing said separated pilot signal and said pilot signal from said pilot signal generating means, said means coupled to said means for separating and said means for generating a pilot signal; and a means for correcting for time base error to facilitate forming said modulated signal from said plurality of heads into a continuous signal without loss of information; said means operatively coupled to said means for reproducing and said means for generating an error signal; whereby the modulated signal may be corrected for time base error thereby facilitating combination of the modulated signals from the plurality of heads to form a continuous signal with substantially no loss of information.

13. In a magnetic recording and reproduce apparatus for recording continuous wideband signals on a magnetic medium, said apparatus comprising: a magnetic head assembly means for transmitting signals to and from said magnetic medium; said head means operatively coupled to said magnetic medium and having a plurality of heads that are periodically coupled to said magnetic medium, whereby a portion of the continuous information is transmitted by each of said heads; a capstan for driving said magnetic medium; means for generating a pilot signal; means for frequency modulating a carrier signal with an information signal; means for combining said pilot signal with said frequency modulated signal; said means for combining operatively coupled to said pilot signal generating means and operatively coupled to said means for frequency modulating; means for applying said combined signal to said magnetic head means, whereby said combined signal is recorded onto said magnetic medium; means for reproducing said combined signal from said magnetic medium, said means for reproducing operatively coupled to said plurality of heads of said head means; means for separating said pilot signal from said frequency modulated signal, said means for separating operatively coupled to said means for reproducing; means for generating an error signal by comparing said separated pilot signal and said pilot signal from said pilot signal generating means, said means coupled to said means for separating and said means for generating a pilot signal; and a means for correcting for time base error to facilitate forming said modulated signal from said plurality of heads into a continuous signal without loss of information; said means operatively coupled to said means for reproducing and said means for generating an error signal; whereby the frequency modulated signal may be corrected for time base error thereby facilitating combination of the frequency modulated signals from the plurality of heads to form a continuous signal with substantially no loss of information.

14. In a magnetic recording and reproduce apparatus for recording continuous wideband signals on a magnetic medium, said apparatus comprising: a magnetic head assembly means for transmitting signals to and from said magnetic medium; said head means operatively coupled to said magnetic medium and having a plurality of heads that are sequentially coupled to said magnetic medium, whereby a portion of the continuous information is transmitted by each of said heads; a capstan for driving said magnetic medium; means for generating a pilot signal; means for generating an information signal; means for combining said pilot signal with said information signal; said means for combining operatively coupled to said pilot signal generating means and said means for generating an information signal; means for applying said combined signal to said magnetic head means, whereby said combined signal is recorded onto said magnetic medium; means for reproducing said combined signal from said magnetic medium, said means for reproducing operatively coupled to said plurality of heads of said head means; means for separating said pilot signal from said frequency modulated signal, said means for separating operatively coupled to said means for reproducing; means for generating an error signal by comparing said separated pilot signal and said pilot signal from said pilot signal generating means, said means coupled to said means for separating and said means for generating a pilot signal; and a means for correcting for time base error to facilitate forming said information signal from said plurality of heads into a continuous signal without loss of information; said means operatively coupled to said means for reproducing and said means for generating an error signal; whereby the information signal may be corrected for time base error thereby facilitating combination of the frequency modulated signals from the plurality of heads to form a continuous signal with substantially no loss of information.

15. The structure of claim 14 including a switcher means for combining the signals from the plurality of heads into a continuous signal, said means operatively coupled to said means for correcting.

16. The structure of claim 14 wherein said means for reproducing includes a means for phase equalization to correct primarily for phase deterioration.

17. In a magnetic reproducing apparatus for reproducing a continuous information signal from information signals recorded on a magnetic medium additively with a pilot signal by a magnetic head assembly having a plurality of magnetic heads, said medium being driven by a driving means, the combination comprising: means for deriving the recorded signals from said magnetic medium by sequential utilization of said plurality of magnetic heads; each head sensing a portion of said combined recorded signals; said sensed signals being processed in separate channels; means for separating said pilot signal component from the information signals in each of said channels; said means for separating operatively coupled to said means for deriving; a source of reference signals; correction means for combining said separated pilot signals with said reference signals to develop error signals and for adjusting the information signals in response to said error signals; and means for combining the corrected information signals into a continuous signal without any significant loss of information.

References Cited by the Examiner

UNITED STATES PATENTS

| | | | |
|---|---|---|---|
| 2,668,283 | 2/1954 | Mullin | 179—100.2 |
| 2,960,568 | 11/1960 | Leyton | 179—100.2 |
| 2,963,555 | 12/1960 | Brubaker | 179—100.2 |
| 2,979,562 | 4/1961 | Leyton | 178—5.4 |

BERNARD KONICK, *Primary Examiner.*

J. R. GOUDEAU, L. G. KURLAND, *Assistant Examiners.*